(12) United States Patent
Boamfa et al.

(10) Patent No.: US 11,408,821 B2
(45) Date of Patent: Aug. 9, 2022

(54) FLUORESCENCE CALIBRATION SLIDE

(71) Applicant: KONINKLIJKE PHILIPS N.V., Eindhoven (NL)

(72) Inventors: Marius Iosif Boamfa, Veldhoven (NL); Susanne Maaike Valster, Valkenswaard (NL); Marcus Antonius Verschuuren, Berkel-Enschot (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/009,285

(22) Filed: Jun. 15, 2018

(65) Prior Publication Data
US 2018/0292311 A1    Oct. 11, 2018

Related U.S. Application Data

(63) Continuation-in-part of application No. PCT/EP2016/082352, filed on Dec. 22, 2016.

(30) Foreign Application Priority Data

Dec. 23, 2015  (EP) .................................. 15202526

(51) Int. Cl.
*G01N 21/27*   (2006.01)
*G02B 21/16*   (2006.01)
(Continued)

(52) U.S. Cl.
CPC ......... *G01N 21/278* (2013.01); *G01N 21/648* (2013.01); *G01N 21/6458* (2013.01);
(Continued)

(58) Field of Classification Search
CPC ............ G01N 21/278; G01N 21/6458; G01N 21/648; G01N 21/16; G02B 21/16; G02B 21/34
(Continued)

(56) References Cited

U.S. PATENT DOCUMENTS 6,905,838 B1 *  6/2005  Bittner ................... G01N 21/21
                                                     435/173.1
7,205,045 B2    4/2007  Holcomb
(Continued)

FOREIGN PATENT DOCUMENTS

CN    103353388 A    10/2013
CN    203405623 U     1/2014
(Continued)

OTHER PUBLICATIONS

PCT International Search Report, International application No. PCT/EP2016/082352, dated Jun. 29, 2017.
(Continued)

*Primary Examiner* — David P Porta
*Assistant Examiner* — Fani Polyzos Boosalis
(74) *Attorney, Agent, or Firm* — Sherry Austin

(57) ABSTRACT

The present invention relates to fluorescence imaging. In order to enhance compatibility with multiple fluorescence channels for calibrating a fluorescence microscope, a calibration slide is provided that comprises a substrate and a pixel layout. The pixel layout comprises a plurality of spaced apart metal nanostructures arranged on a surface of the substrate. The metal nanostructures are arranged to produce plasmon resonances that allow absorbing light at an excitation wavelength to produce photo-luminescence and/ or fluorescence light for generating a fluorescent image. The fluorescent image comprises a plurality of pixel intensity values that are provided for calibration of a fluorescence microscope.

20 Claims, 9 Drawing Sheets

(51) Int. Cl.
  *G01N 21/64*  (2006.01)
  *G02B 21/34*  (2006.01)
(52) U.S. Cl.
  CPC ............ *G02B 21/16* (2013.01); *G02B 21/34* (2013.01); *G01N 2021/6482* (2013.01)
(58) Field of Classification Search
  USPC ..................................................... 250/252.1
  See application file for complete search history.

(56) References Cited

U.S. PATENT DOCUMENTS

| | | | |
|---|---|---|---|
| 8,352,207 B2 | 1/2013 | Tokhtuev | |
| 8,563,326 B2 | 10/2013 | Haberstroh | |
| 10,545,075 B2 | 1/2020 | Deisseroth | |
| 2004/0009098 A1* | 1/2004 | Torre-Bueno | G01N 1/31 422/63 |
| 2004/0196455 A1 | 10/2004 | Ermantraut et al. | |
| 2007/0122834 A1 | 5/2007 | Sugiyama | |
| 2008/0309929 A1* | 12/2008 | Christiansen | G01N 21/276 356/243.1 |
| 2009/0195866 A1* | 8/2009 | Kawaski | G01N 21/6458 359/385 |
| 2009/0279787 A1* | 11/2009 | Kishii | G06K 19/06037 382/195 |
| 2009/0325816 A1* | 12/2009 | Mirkin | B82Y 40/00 506/15 |
| 2011/0318226 A1* | 12/2011 | Ge | G01N 21/278 422/63 |
| 2013/0029559 A1 | 1/2013 | Tremblay et al. | |
| 2013/0044200 A1* | 2/2013 | Brill | G02B 21/365 348/79 |
| 2013/0157261 A1 | 6/2013 | Sharpe | |
| 2015/0138632 A1* | 5/2015 | Mikhailov | G02B 21/26 359/391 |
| 2016/0048010 A1* | 2/2016 | Nowatzyk | G02B 21/33 359/15 |
| 2016/0061654 A1* | 3/2016 | Corwin | G01N 21/274 702/104 |
| 2016/0327486 A1* | 11/2016 | Di Fabrizio | B82Y 20/00 |
| 2020/0264096 A1 | 8/2020 | Boamfa | |

FOREIGN PATENT DOCUMENTS

| | | | | |
|---|---|---|---|---|
| EP | 2653903 A1 * | 10/2013 | ........... | G01N 21/554 |
| JP | 2010192829 A | 9/2010 | | |
| JP | 2011099720 A | 5/2011 | | |
| JP | 2015102708 A | 6/2015 | | |
| WO | 2013039454 A1 | 3/2013 | | |

OTHER PUBLICATIONS

Kim S. et al., "Patterned Arrays of Au Rings for Localized Surface Plasmon Resonance", Langmuir, vol. 22, No. 17, Aug. 1, 2006, pp. 7109-7112.

Barnes, W. et al., "Surface plasmon subwavelength optics", Nature, vol. 424, No. 6950, Aug. 14, 2003, pp. 824-830.

Resch-Gengeret U. et al., "How to Improve Quality Assurance in Fluorometry: Fluorescence-Inherent Sources of Error and Suited Fluorescence Standards", Journal of Fluorescence, vol. 15, No. 3, pp. 337-362, May 2005.

Royonet A. et al., "Calibration of Fluorescence Microscopes—A New Durable Multi-Dimensional Ruler", Imaging and Microscopy, vol. 5, No. 3, pp. 41-43, 2013.

\* cited by examiner

FLUORESCENCE CALIBRATION SLIDE

CROSS-REFERENCE TO RELATED APPLICATIONS

This patent application is a continuation-in-part application that claims the priority benefit under 35 U.S.C. § 111(a) of International Patent Application No. PCT/EP2016/082352, filed Mar. 24, 2016, which claims the benefit of European Patent Application No. 15202526.8, filed on Dec. 23, 2015. These applications are hereby incorporated by reference herein in their entirety.

FIELD OF THE INVENTION

The present invention relates to the field of fluorescence imaging, and in particular to a calibration slide, to a calibration system of a fluorescence microscope, and to a method for calibrating a fluorescence microscope.

BACKGROUND OF THE INVENTION

Fluorescence imaging has been used in e.g. biology, medicine, and materials science. For example, in digital pathology, fluorescence imaging enables multi-channel scanning of fluorescently labeled slides, helping researchers get more information from their samples. However, after long-term usage, the scanning accuracy of a fluorescence imaging system may fluctuate or even decline, e.g. due to malfunctioned optics arrangement of the fluorescence microscope. A fluorescence microscope may thus need to be routinely calibrated to assure performance. A calibration slide is commonly used for calibrating a fluorescence microscope. For example, US 2013/0292559 A1 describes a fluorescence dye based calibration slide. However, multiple fluorescence dyes may be required for dye based calibration slides in order to be compatible to multiple fluorescence channels.

SUMMARY OF THE INVENTION

There may be a need to provide a calibration slide that is compatible with multiple fluorescence channels.

The object of the present invention is solved by the subject-matter of the independent claims, wherein further embodiments are incorporated in the dependent claims. It should be noted that the following described aspects of the invention apply also for the calibration slide, for the calibration system of a fluorescence microscope, and for the method for calibrating a fluorescence microscope.

According to a first aspect of the present invention, a calibration slide is provided for a fluorescence microscope. The calibration slide comprises a substrate and a pixel layout comprising a plurality of spaced apart metal nanostructures arranged on a surface of the substrate. The metal nanostructures are arranged to produce plasmon resonances that allow absorbing light at an excitation wavelength to produce photo-luminescence and/or fluorescence light for generating a fluorescent image. The fluorescent image comprises a plurality of pixel intensity values that are provided for calibration of a fluorescence microscope.

It should be noted here that the invention can advantageously be used in any type of microscopes that is suitable for so-called Whole Slide Imaging in Digital Pathology. For instance, the invention encompasses line based scanning as well as tile based scanning microscopes.

The plasmon resonances based calibration slide shows a broad absorption and emission spectrum, which may cover all typical fluorescence channels when excited with light at corresponding excitation wavelength. Thus, the same area of the calibration slide may offer photo-luminescence and/or fluorescence output over a large spectral range. In other words, one type of plasmonic structures on the calibration slide may be used to calibrate all fluorescence channels. This may replace the need of multiple fluorescence dyes. Further, due to the nature resonant absorption of the excitation light in the metal nanostructures and re-emission of a fraction of the excitation light at different wavelengths, the photo-luminescence and/or fluorescence of such calibration slide may be less prone to degradation. For example, in contrast to traditional dye based samples, such calibration slide may be stable in time and may not show bleaching. Furthermore, since plasmonics do not fade out over time, there may be no need to calibrate the calibration slide, e.g. every year.

According to an example, the substrate is optically transparent.

Thus, the fluorescence imaging can be combined with bright field imaging, in which the pixel layout is visible as a color image. The visibility of the pixel layout of the calibration slide may allow for fast positioning, sample location and visual sample inspection, which make the calibration faster.

According to an example, the metal nanostructures are arranged to couple to each other.

By making a combination of localized and coupled resonances, it is possible to design a calibration slide with a resonance wavelength ranging from ultraviolet to red. This offers the flexibility of creating different colors under bright light illumination.

In an example, the calibration slide is provided not only for calibrating fluorescence response, but also for calibrating colors e.g. for a bright-field and fluorescence imaging system. Such combination may improve efficiency of calibration process.

According to an example, the calibration slide is further provided with at least one layout selected from the group comprising a monolayer of colored microbeads, a resolution and distortion test target, and a layer of inorganic phosphors.

In other words, the calibration slide comprises two or more different samples or targets. In an example, the calibration slide comprises a pixel layout for producing photo-luminescence and/or fluorescence from plasmonic effects and a monolayer of colored micro-beads. In a further example, the calibration comprises a pixel layout, a monolayer of colored micro-beads, and a resolution and distortion test target.

In this way, fluorescence and phantom features can be mimicked with plasmonic resonances. Focus and imaging can be assessed with microbeads. A resolution and distortion target assesses resolution and stitching artifacts. With the combination of multiple targets on the same calibration slide, a more efficient and accurate calibration may be achieved.

Furthermore, the inorganic phosphors may also be combined with plasmonics to enhance the emission of a certain part of the emission spectrum.

According to a fourth aspect of the present invention, a method is provided for manufacturing a fluorescence calibration slide with a plurality of layouts comprising a pixel layout with a plurality of spaced apart metal nanostructures arranged on a surface of the substrate, a monolayer of colored microbeads, and a resolution and distortion test target, the method comprises the following steps:

aa) depositing a monolayer of colored microbeads on a substrate forming a microscope slide;
bb) depositing a pixel layout and a resolution and distortion test target on two different substrates forming two cover slips; and
cc) assembling two cover slips on the microscope slide to form a calibration slide.

In other words, the three processes can be done on separate substrates, which are assembled together after finishing these processes.

In this way, although the manufacturing methods of these three techniques (nano-imprint lithography and dry etching, chemical bonding, and optical lithography) are not compatible to each other, it is also possible to combine all three on one calibration slide.

According to a second aspect of the present invention, a calibration system of a fluorescence microscope is provided. The calibration system comprises a fluorescence microscope and a calibration slide according to one of the examples described above and in the following. The fluorescence microscope comprises a light source and a light detector. The light source and the light detector are arranged in an optical path. In calibration, the light source is configured to provide light to be absorbed by the metal nanostructures of the calibration slide positioned in the optical path at an excitation wavelength to produce photo-luminescence and/or fluorescence light. The light detector is configured to detect the produced photo-luminescence and/or fluorescence light for acquiring fluorescent image data as calibration test data for calibration purposes.

The fluorescence microscope may be used in digital pathology. For example, the fluorescence microscope may be e.g. a multi-channel fluorescence digital pathology scanner, a bright-field and fluorescence digital pathology scanner, or a bright-field, fluorescence, and fluorescence in situ hybridization (FISH) digital pathology scanner.

Thus, the fluorescence imaging system may be calibrated in multiple fluorescence channels without the need of changing the calibration slide. This may simplify the calibration procedure and increase the efficiency. Further, the calibration accuracy may also be assured due to the uniformity of fluorescence intensity at microscopic level.

According to an example, the calibration system is further provided with a calibration device comprising a storage unit and a processing unit. The storage unit is configured to store predetermined standard calibration data of at least one fluorescence channel. The processing unit is configured to compare the acquired calibration test data with the stored predetermined standard calibration data to generate an intensity correction profile of the at least one fluorescence channel. The intensity correction profile is provided for correcting fluorescence image data of a fluorescent pathological sample obtained with the fluorescence microscope for the at least one fluorescence channel.

The calibration device may be an integral part of the fluorescence microscope. Alternatively, the calibration device may be a computer.

According to an example, in addition to the pixel layout, at least one layout is provided on the surface of the calibration slide, which is selected from the group comprising a monolayer of colored microbeads and a resolution and distortion test target. The light detector is configured to acquire image data of the at least one layout as further calibration test data. The storage unit is configured to store further predetermined standard calibration data of the at least one layout. The processing unit is configured to compare the acquired further calibration test data and the stored further predetermined standard calibration data for calibrating a parameter of the fluorescence microscope. The parameter is selected from the group comprising focus quality of the fluorescence microscope and resolution and stitching artifacts.

In this way, fluorescence, color, focus, imaging and stitching, or a combination thereof of the fluorescence microscope can be assessed and calibrated without changing the calibration slide. The calibration process may be simplified, which may also enhance the efficiency for calibrating a fluorescence microscope.

According to an example, the fluorescence microscope is an epi-fluorescence microscope.

The epi-fluorescence method may provide a high signal-to-noise ratio.

According to a third aspect of the present invention, a method is provided for calibrating a fluorescence microscope comprising a light source and a light detector, which are arranged in an optical path, the method comprising the following steps:
a) illuminating a calibration slide positioned in the optical path with light from the light source towards the light detector; wherein the calibration slide comprises a substrate and a pixel layout comprising a plurality of spaced apart metal nanostructures arranged on a surface of the substrate, wherein the metal nanostructures are arranged to produce plasmon resonance; and
wherein the light illuminating the calibration slide produces plasmon resonances that allow absorbing light at an excitation wavelength to produce photo-luminescence and/or fluorescence light for generating a fluorescent image comprising a plurality of pixel intensity values that are provided for calibration of the fluorescence microscope;
b) acquiring fluorescent image data of the fluorescence image as calibration test data; and
c) using the calibration test data for calibration purposes of the fluorescence microscope.

According to an example, the method step c) further comprises the following sub-steps:
c1) providing predetermined standard calibration data;
c2) comparing the obtained calibration test data with the predetermined standard calibration data to generate a intensity correction profile; and
c3) using the intensity correction profile to calibrate fluorescence image data of a fluorescent pathological sample obtained with the fluorescence microscope.

According to an example, in addition to the pixel layout, at least one layout is provided on the surface of the calibration slide, which is selected from the group comprising a monolayer of colored microbeads and a resolution and distortion test target; and
wherein the method further comprises the following steps:
d) acquiring image data of the at least one layout as further calibration test data;
e) providing further predetermined standard calibration data of the at least one layout; and
f) comparing the acquired further calibration test data and the stored further predetermined standard calibration data for calibrating a parameter of the fluorescence microscope;
wherein the parameter is selected from the group comprising:
focus quality of the fluorescence microscope; and
resolution and stitching artifacts.

According to an aspect of the present invention, a calibration slide is provided that makes use of plasmon resonance effects to absorb light at an excitation wavelength to produce photo-luminescence and/or fluorescence light for calibrating a fluorescence microscope. The calibration slide comprises a thin layer of metal nanostructures, which have a thickness of less than 1 µm. The thin thickness may ensure that there are no out of focus areas on the calibration slide and additionally that the calibration slide has a thickness comparable to a pathology slide. Thus, the calibration slide is also suitable for applications like digital pathology. Further, the calibration slide has homogeneous fluorescence intensity across the calibration slide at microscopic level. The fluorescence of the calibration slide is also less prone to degradation compared to fluorescence dye based calibration slides. Due to the fabrication process, the homogeneous fluorescence intensity can also be guaranteed over large batches, which is suitable for assessing scanner to scanner variability.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

The figures are only schematically illustrated and not to scale. Same reference signs refer to same or similar features throughout the figures.

DETAILED DESCRIPTION OF EMBODIMENTS

Figure 1A:
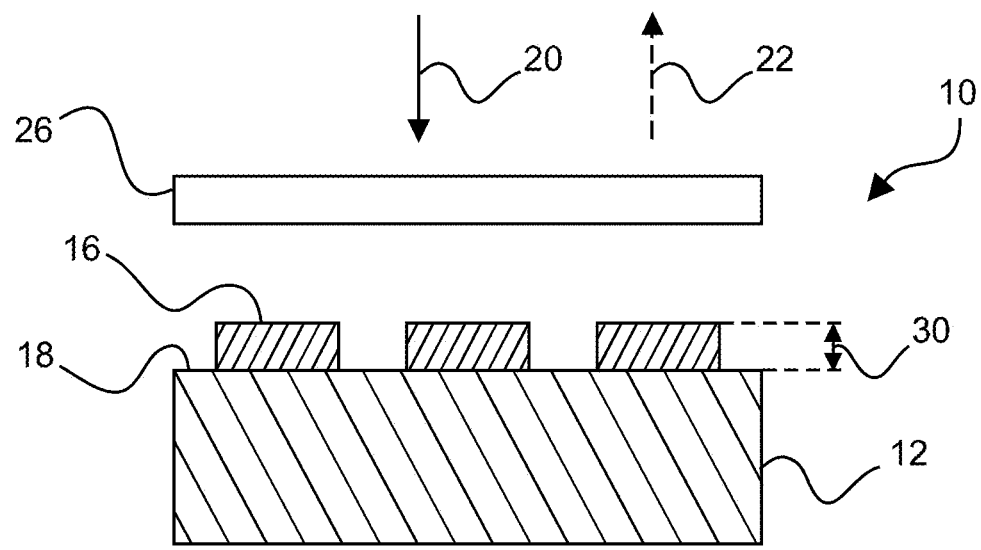
FIGS. 1A and 1B show a schematic view of an example of a calibration slide.
Figure 1B:
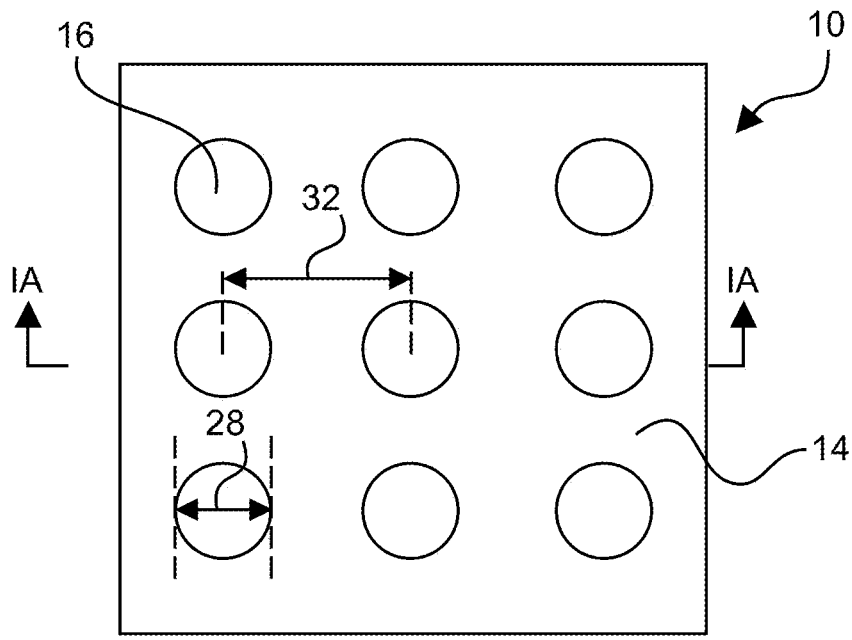
Figure 7:
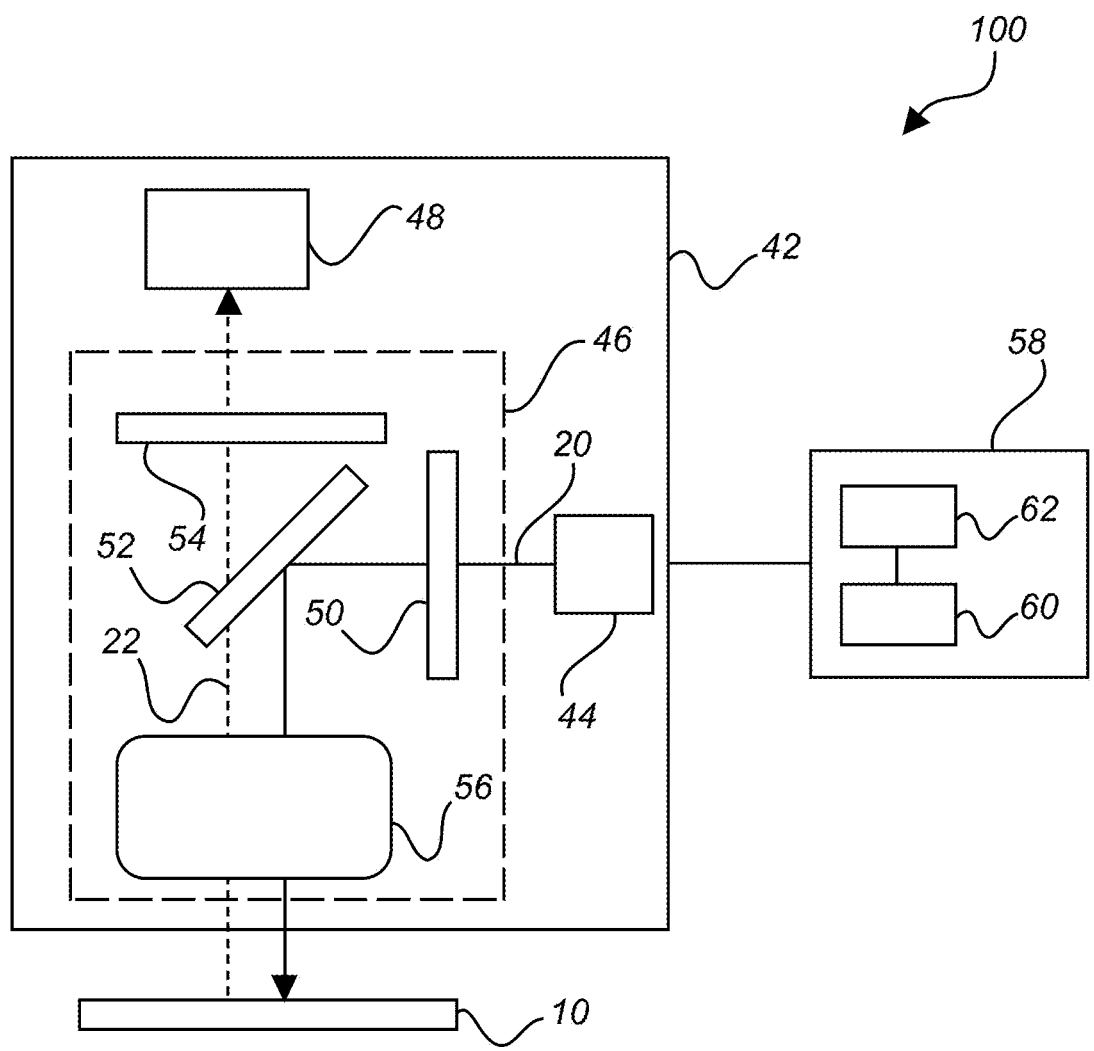
FIG. 7 shows an example of a fluorescence microscope.

FIG. 1B shows a top view of an example of a calibration slide 10 for a fluorescence microscope 42 (see an example in FIG. 7). FIG. 1A shows a sectional view along a line 1A-1A shown in FIG. 1B.

The calibration slide 10 comprises a substrate 12 and a pixel layout 14 with a plurality of spaced apart metal nanostructures 16 arranged on a surface 18 of the substrate 12. The metal nanostructures 16 are arranged to produce plasmon resonances that allow absorbing light 20 at an excitation wavelength, indicated with a solid arrow, to produce photo-luminescence and/or fluorescence light 22, indicated with a dashed arrow, for generating a fluorescent image. The fluorescent image comprises a plurality of pixel intensity values that are provided for calibration of the fluorescence microscope.

Optionally, a cover slip 26 is provided for covering and protecting the pixel layout 14. For mounting the optional cover slip 26, it is possible to use glue, resin, or any other appropriate material that gets in between the metal nanostructures 16.

A further option is to cover the metal nanostructures 16 with an optically transparent oxide layer (not shown). With the oxide layer, the metal nanostructures 16 can be conformally coated. The oxide layer may be made of e.g. Silicon dioxide ($SiO_2$), Silicon nitride ($Si_3N_4$), a mixture of $SiO_2$ and $Si_3N_4$ ($SiO_xN_y$) or any other appropriate oxide or material. The optional oxide layer may offer a better protection and ease of the cover slip attachment.

The substrate 12, also referred to as dielectric substrate, may be made of any appropriate material.

In an example, the substrate 12 is non-transmissive (or less transmissive) to light. For example, the substrate 12 is a silicon (Si) substrate, a silicon-on-insulator (SOI) substrate or a germanium (Ge) substrate.

In another example, the substrate 12 is optically transparent at a working wavelength, which allows transmitting light without appreciable scattering or absorption. The substrate 12 may be fully transparent. For example, the substrate 12 can transmit more than 90 percent of light. The substrate 12 may also be partially transparent. For example, the substrate 12 can transmit 60 percent of light. For example, the substrate may be made of silicon dioxide, titanium dioxide, silicon nitride, quartz, fused silica, plastics, sapphire, etc.

The transparency of the substrate 12 may enable the calibration slide 10 to work in transmission mode, which allows a combination with bright field imaging. In this way, the sample (or pixel layout) is visible in bright field microscopy, which allows for fast positioning, sample location and visual sample inspection and thus makes the calibration faster.

In a further example, the substrate 12 may also be a substrate with low auto-fluorescence. However, the auto-fluorescence of such substrate should be low enough without appreciably affecting the contrast of the plasmon generated photo-luminescence and/or fluorescence. The skilled person in the art will understand using common general knowledge how to create such low auto-fluorescence substrate. The base material of the substrate should be low fluorescent by itself and it should contain no or very little impurities that show auto-fluorescence, such as organic molecules impurities, metal impurities or fluorescence dye impurities. There exist several grades of low fluorescence glass and even few examples of plastics, for example high optical grade quartz, fused silica, N-KZFS5 glass, and Zeonex (Cyclo Olefin Polymer). If the material is not manufactured with this quality in mind the probability that it would exhibit large auto-fluorescence is high, due to the uncontrolled contamination during the fabrication process. For example, Borofloat® and Soda-lime glasses are two excellent optical grade glasses that however exhibit large auto-fluorescence because they are not manufactured for this purpose.

In an example, both the coverslip 26 may also be with low auto-fluorescence to further avoid lowering the sample contrast and thus decreasing its calibration properties.

The metal nanostructures 16 may comprise a metal selected from the group comprising gold, silver, copper, and aluminium. Other metals suitable for producing plasmon resonances may also be considered. Optionally or preferably, the metal is aluminium or aluminium alloy. Aluminium can support plasmon resonance into the ultraviolet (UV), which is not possible for silver and gold. Further, aluminium is stable in the environment and has less cost than silver and gold.

The term "nanostructure" relates to structure with at least one dimension on the nanoscale.

In an example, each metal nanostructure has a cross-sectional dimension 28 in a range of 30 nm to 700 nm, preferably 60 nm to 450 nm. The cross-section dimension 28 relates to a dimension along the surface 18 of the substrate 12, on which the metal nanostructures 16 are arranged. In FIG. 1B, the metal nanostructures 16 are illustrated to have a cross section in form of a circular shape. In this case, the cross-section dimension 28 relates to the diameter of the circular shape.

In an example, each metal nanostructure has a thickness 30 in a range of 10 nm to 1 μm, preferably 25 nm to 150 nm. The term "thickness" relates to the height of the metal nanostructure 16 that extend from the surface 18 of the substrate 12.

As shown in FIG. 1A, the metal nanostructures 16 may form protrusions on the surface 18 of the substrate 12. In another example (not shown), the metal nanostructures 16 may form recesses on the surface 18 of the substrate 12.

The metal nanostructures 16 may be arranged periodically along the surface 18 of the substrate 12. For example, in FIG. 1B, the metal nanostructures 16 are arranged in a two-dimensional square lattice. The metal nanostructures 16 may also be arranged differently, e.g. in a two-dimensional hexagonal lattice.

In another example (not shown), the metal nanostructures 16 are arranged in a quasi periodical manner with irregular periodicity.

In an example, a distance 32 between adjacent metal nanostructures 16 is comparable to a visible light wavelength, which is in a range of 100 nm to 1 μm, preferably 180 nm to 650 nm. The distance 32 may also referred to as pitch, which is the distance between the centers of two adjacent metal nanostructures. As an option, the metal nanostructures 16 are arranged to couple to each other.

The term "to couple" relates to coupled resonances between adjacent metal nanostructures.

A combination of localized and coupled resonances makes it possible to create different colors covering a broad wavelength range. Such combination may offer the flexibility to design a calibration slide for calibrating both fluorescence and color responses.

The arrangement of the metal nanostructures 16 on the surface 18 of the substrate 18 defines the pixel layout 14.

FIG. 2A to FIG. 2D show a top view of further examples of the pixel layout 14 of the calibration slide 10.

Figure 2A:
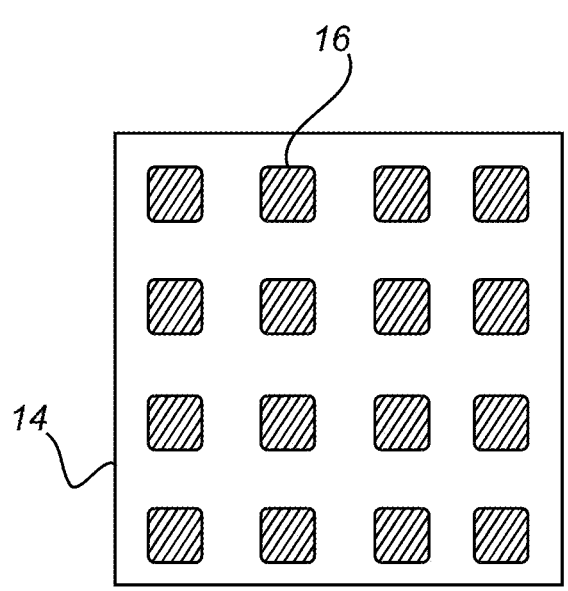
FIGS. 2A to 2D show further examples of a calibration slide.

In FIG. 2A, the pixel layout 14 comprises a lattice of single size metal nanostructures 16. Each metal nanostructure 16 defines a pixel.

Figure 2B:
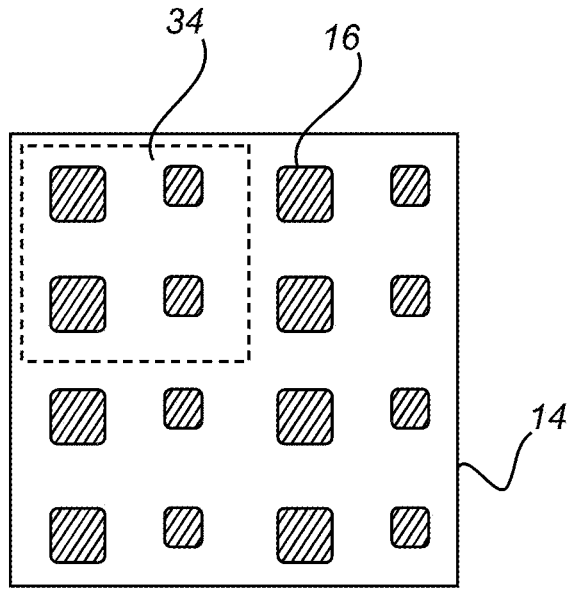
Figure 2C:
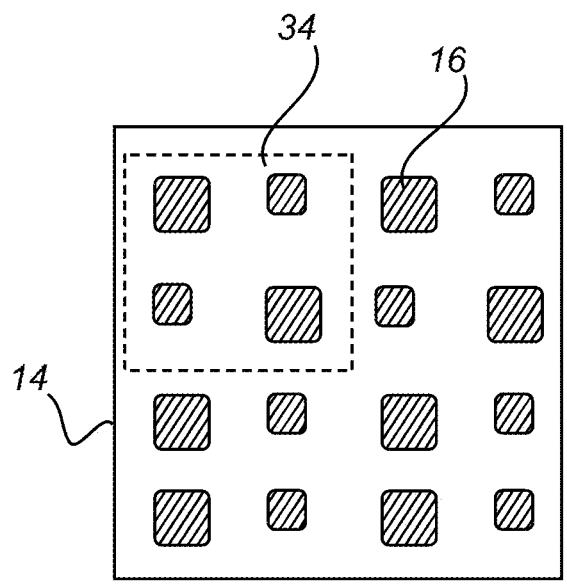
Figure 2D:
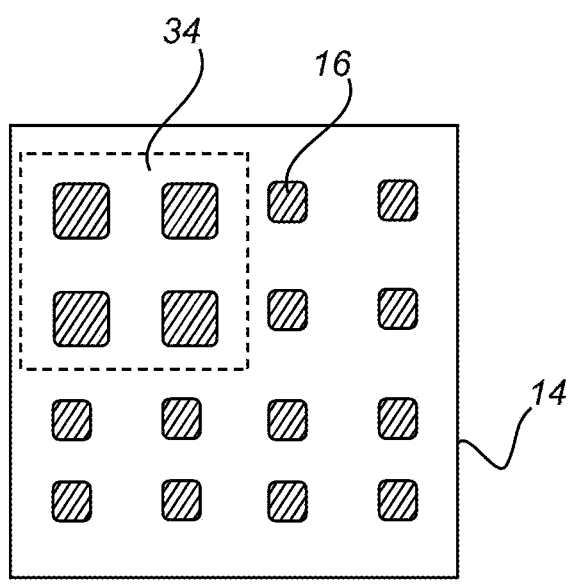

In FIGS. 2B, 2C and 2D, the colors are set by the periodicity of a plurality of metal nanostructure units 34, so each metal nanostructure unit defines a large pixel.

In FIGS. 2B and 2C, each metal nanostructure unit 34 comprises metal nanostructures 16 with different cross-sectional dimensions.

In FIG. 2D, the metal nanostructure unit 34 comprises metal nanostructures 16 with a different cross-sectional dimension from the rest of the pixel layout 14.

In this way, various features can be patterned on the surface of the calibration slide.

Figure 3A:
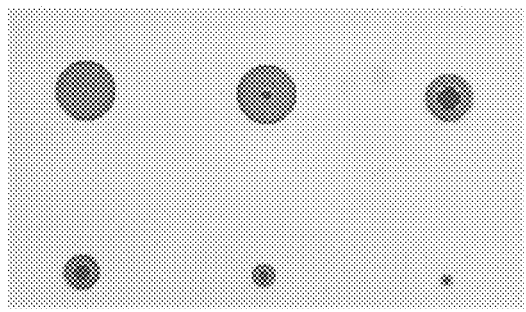
FIGS. 3A and 3B show two examples of a fluorescence image of a calibration slide.
Figure 3B:
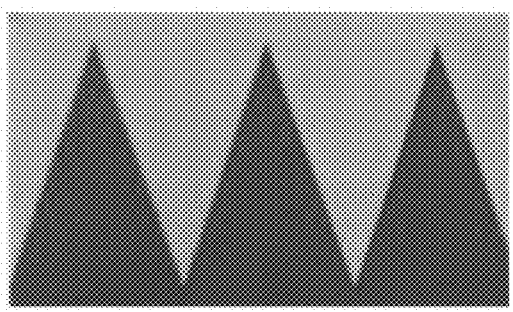

FIG. 3A and FIG. 3B show two examples of a fluorescence image of the calibration slide 10. In FIG. 3A, the calibration slide 10 is patterned with small scale features. In FIG. 3B, the calibration slide 10 is patterned with large scale features.

The pixel layout 14 of the metal nanostructures 16 may be manufactured by using a method selected from the group comprising nano-imprint lithography and dry etching. Due to the fabrication process, the uniformity can be guaranteed over large batches, which is suitable for standardization purpose. The fabrication process may also ensure the flexibility in patterning the calibration slide with custom fluorescent patterns (see e.g. FIG. 3A and FIG. 3B).

Further, it is noted that the same area of the pixel layout 14 can offer fluorescence output over a large spectral range when exposed to different excitation wavelengths.

Figure 4A:
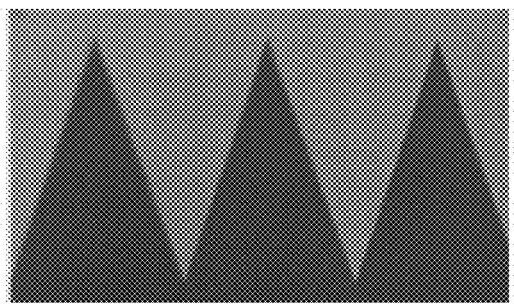
FIGS. 4A and 4B show an example of fluorescence images of the calibration slide in FIG. 3B, when exposed to light with two different excitation wavelengths.
Figure 4B:
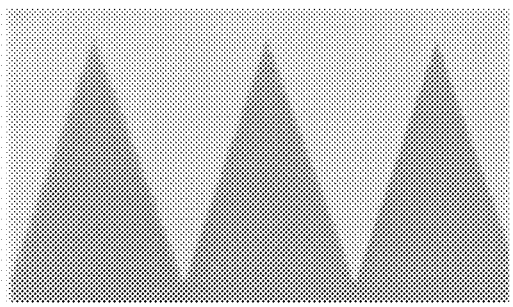

FIG. 4A and FIG. 4B show two examples of a fluorescence image of the pixel layout 14 in FIG. 3B, when exposed to light with two different excitation wavelengths.

In other words, the same calibration slide can show a broad absorption and emission spectrum that may cover all typical fluorescence channels when excited with the corresponding excitation wavelengths.

The term "fluorescence channel" relates to a pair of excitation and emission filters that selectively transmit light of excitation and emission wavelengths specific for a dye, such as 4',6-diamidino-2-phenylindole (DAPI), fluorescein isothiocyanate (FITC), Tetramethylrhodamine (TRITC), and Cyanines (Cy).

In this way, multiple fluorescence dyes may be not required. One type of plasmonic metal nanostructures may calibrate all fluorescence channels.

In addition, since the calibration slide also works in transmission mode and the pixels can also produce colors under bright-light illumination, the same calibration slide may also offer means for color calibration.

Figure 5:
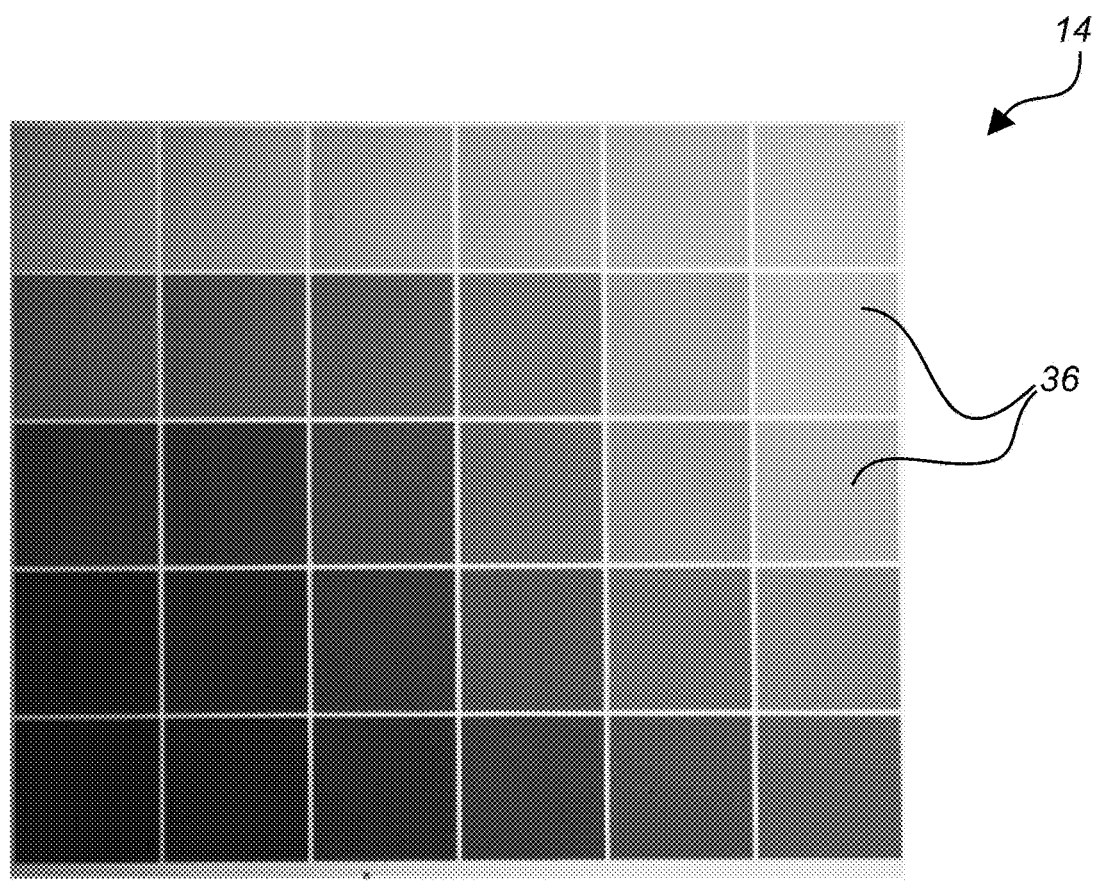
FIG. 5 shows a further example of a calibration slide for both fluorescence and color calibration.

FIG. 5 shows an example of the calibration slide 10 for both fluorescence and color calibration. The calibration slide 10 comprises at least two pixel sub-layouts 36. The at least two pixel sub-layouts 36 are configured to generate different colors (shown as different gray levels) under bright-light illumination, e.g. with metal nanostructures 16 with different sizes and/or different arrangement.

This may offer a flexible design of a color chart (or color target) for a selected color calibration method. For example, the pixel layout 14 may represent an IT8 color target with 24 grey fields and 264 color fields in form of pixel sub-layouts 36. The pixel layout 14 may also represent MGH (Massachusetts General Hospital) color target with 8 color fields in form of pixel-layouts 36. Thus, the pixel sub-layouts may also be referred to as color samples.

Figure 6:
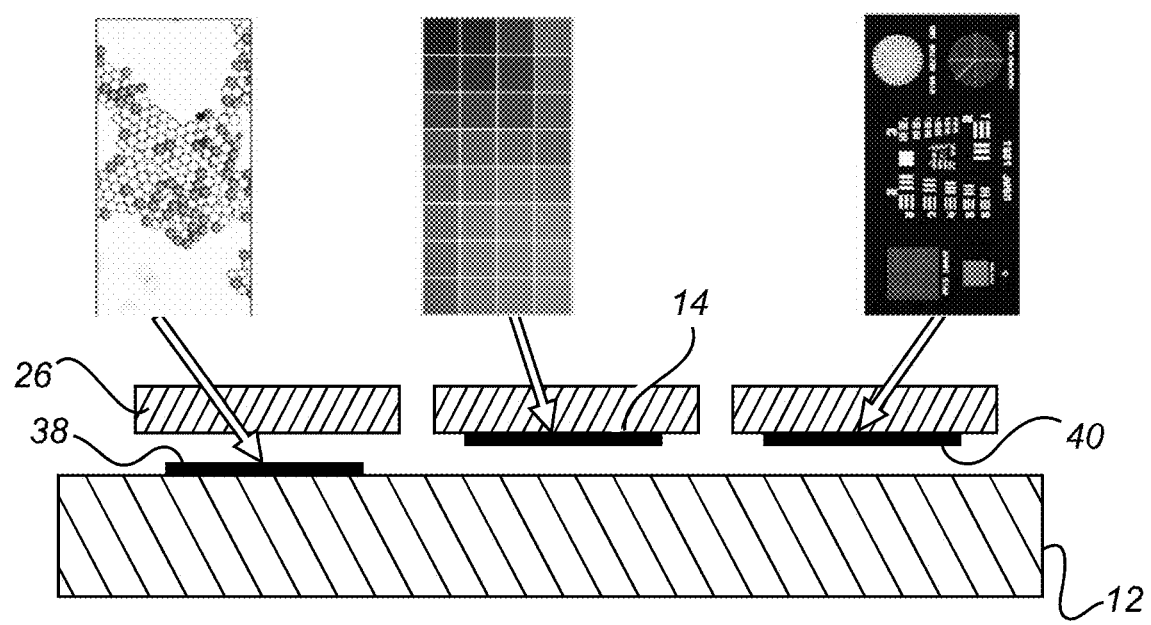
FIG. 6 shows a further example of a calibration slide with multiple layouts.

FIG. 6 shows a further example, where in addition to the pixel layout 14, at least one layout 38, 40 is provided on the surface 18 of the calibration slide 10. The at least one layout 38, 40 is selected from the group comprising a monolayer of colored microbeads and a resolution and distortion test target. As an option, both layouts 38, 40 are provided on the surface 18: the layout 38 comprises a monolayer of colored microbeads; and the layout 40 comprises a resolution and distortion test target.

In other words, the calibration slide 10 may comprise two or more different samples or targets. For example, the calibration slide 10 may comprise a fluorescence target with photo-luminescence and/or fluorescence produced from plasmonic effects, a monolayer of colored micro-beads, a resolution and distortion test target, or a combination thereof.

In this way, fluorescence and phantom features can be mimicked with plasmonic resonances. Focus and imaging can be assessed with microbeads. A resolution and distortion target assesses resolution and stitching artifacts. Thus, the efficiency of the calibration process may be improved.

Further, this also enables a user to embed this complex sample into a scanner or a scanner stage.

The multiple layouts may be deposited on the substrate in any suitable method. In an example, shown as an option in FIG. 6, the microbeads of the layout 38 are chemically attached to the substrate 12, whereas the metal nanostructures of the pixel layout 14, and the resolution and distortion target of the layout 40 are deposited on two cover slips 26 e.g. by optical lithography process.

This may allow a combination of multiple layouts with different manufacturing methods.

As a further option, in addition to the pixel layout 14, a layer of inorganic phosphors (not further shown), such as cerium-doped yttrium aluminium garnet (YAG:Ce), or line emitters in nano-particles, may be provided. The layer of inorganic phosphors may be arranged in an overlay or overlapping manner with the pixel layout. The inorganic phosphors may have a particle size in a range of micro- to sub-200 nm.

In this way, the metal nanostructures may allow resonant excitation of the inorganic phosphors, e.g. nano-phosphors, enhancing the conversion of light. Further, due to their high chemical stability, the inorganic phosphors may not (or less) degrade in time.

FIG. 7 shows an example of a calibration system 100 of a fluorescence microscope in a schematic view. The calibration system 100 comprises a fluorescence microscope 42 and the calibration slide 10 according to one of the above-mentioned examples.

The fluorescence microscope 42 comprises a light source 44, an optional optics arrangement 46, and a light detector 48. The optics arrangement 46 may for example comprise an excitation filter 50, a dichroic mirror 52 (or dichroic beamsplitter), an emission filter 54, and an objective lens 56 (or lenses). The light source 44, the optics arrangement 46, and the light detector 48 are arranged in an optical path.

In calibration, the light source 44 is configured to provide light 20, indicated with a solid arrow, passing through the optics arrangement 46 to be absorbed by the metal structures 16 (not further shown) of the calibration slide 10 positioned in the optical path at an excitation wavelength to produce photo-luminescence and/or fluorescence light 22, indicated with a dashed arrow. The light detector 48 is configured to detect the photo-luminescence and/or fluorescence light 22 for acquiring fluorescence image data as calibration test data.

In an example, shown as an option in FIG. 7, the fluorescence microscope 42 is an epi-fluorescence microscope, in which light 20 of the excitation wavelength is focused on the calibration slide 10 through the objective lens 56. The photo-luminescence and/or fluorescence light 22 emitted by the calibration slide 10 is focused to the light detector 48 by the same objective lens 56 that is used for the excitation. In other words, only reflected excitatory light 20 reaches the objective lens 56 together with the emitted photo-luminescence and/or fluorescence light. The epi-fluorescence method therefore may give a high signal-to-noise ratio.

The fluorescence microscope 42 may be used in digital pathology. Examples include a multi-channel fluorescence digital pathology scanner, a bright-field and fluorescence digital pathology scanner, or a bright-field, fluorescence, and FISH digital pathology scanner.

As an option, as shown in FIG. 7, the calibration system 100 is further provided with a calibration device 58. The calibration device 58 comprises a storage unit 60 and a processing unit 62.

The storage unit 60 is configured to store predetermined standard calibration data of at least one fluorescence channel. The processing unit 62 is configured to compare the acquired calibration test data with the stored predetermined standard calibration data to generate an intensity correction profile of the at least one fluorescence channel. The intensity correction profile is provided for correcting fluorescence image data of a fluorescent pathological sample obtained with fluorescence microscope for the at least one fluorescence channel.

In an example, the intensity correction profile is an intensity correction value.

In a further example, the intensity correction profile is an intensity correction matrix.

In an example, the calibration device 58 is integrated with the fluorescence microscope 42. In another example, the calibration device 58 is a computer that receives the calibration test data from the fluorescence microscope 42.

As a further option, in addition to the pixel layout 14, at least one layout 38, 40 is provided on the surface 18 of the calibration slide 10, which is selected from the group comprising a monolayer of colored microbeads and a resolution and distortion test target (see FIG. 6). The light detector 48 is further configured to acquire image data of the at least one layout 38, 40 as further calibration test data. The storage unit 60 is configured to store further predetermined standard calibration data of the at least one layout 38, 40. The processing unit 62 is configured to compare the acquired further calibration test data and the stored further predetermined standard calibration data for calibrating a parameter of the fluorescence microscope 42. The parameter is selected from the group comprising focus quality of the fluorescence imaging system and resolution and stitching artifacts.

The calibration of the focus quality of the fluorescence microscope may be based on a measurement of a property of the microbeads images selected from the group comprising intensity, area, density, and distribution. The values of the measured property are then compared to further predetermined standard calibration data, i.e. a known value, for calibrating the fluorescence microscope.

Thus, the same calibration slide can be used to calibrate fluorescence, color, focus quality, resolution and stitching artifacts. The efficiency of the calibration process can thus be improved.

In an example, the calibration slide 10 is permanently mounted on the fluorescence microscope 42.

In other words, the calibration slide may be integrated in the fluorescence microscope 42. This may ensure very high quality in time.

Figure 8:
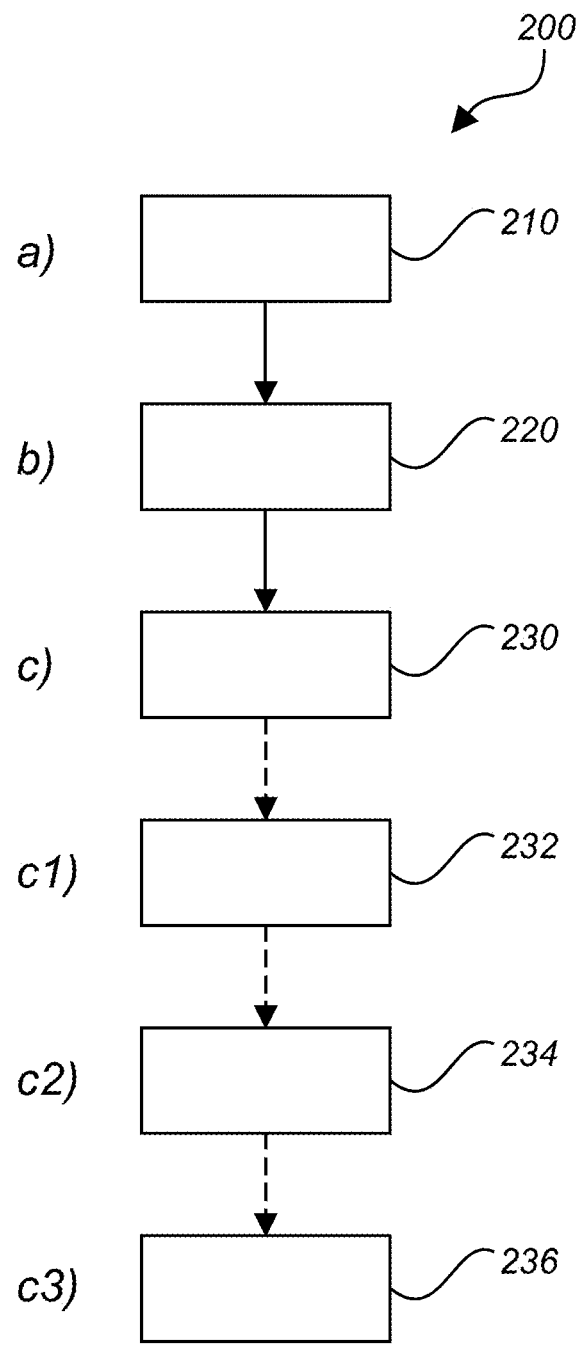
FIG. 8 shows basic steps of an example of a method for calibrating a fluorescence microscope.

FIG. 8 shows a method 200 for calibrating a fluorescence microscope with a fluorescence microscope comprising a light source and a light detector, which are arranged in an optical path.

The method 200 comprises the following steps:

In a first step 210, also referred to as step a), a calibration slide is positioned in the optical path and illuminated with light from the light source towards the light detector. The calibration slide comprises a substrate and a pixel layout comprising a plurality of spaced apart metal nanostructures arranged on a surface of the substrate, wherein the metal nanostructures are arranged to produce plasmon resonance. The light illuminating the calibration slide produces plasmon resonances that allow absorbing light at an excitation wavelength to produce photo-luminescence and/or fluorescence light for generating a fluorescent image comprising a plurality of pixel intensity values that are provided for calibration of the fluorescence microscope.

In a second step 220, also referred to as step b), fluorescent image data of the fluorescence image is acquired as calibration test data.

In a third step 230, also referred to as step c), the calibration test data is used for calibration purposes of the fluorescence microscope.

In an example, shown as an option in FIG. 5, the method step c) further comprises the following sub-steps:

In a first sub-step 232, also referred to as sub-step c1), predetermined standard calibration data are provided.

In a second sub-step 234, also referred to as sub-step c2), the acquired calibration test data is compared with the predetermined standard calibration data to generate an intensity correction profile.

In a third sub-step 236, also referred to as sub-step c3), the intensity correction profile is used to calibrate fluorescence image data of a fluorescent pathological sample obtained with the fluorescence microscope.

Figure 9:
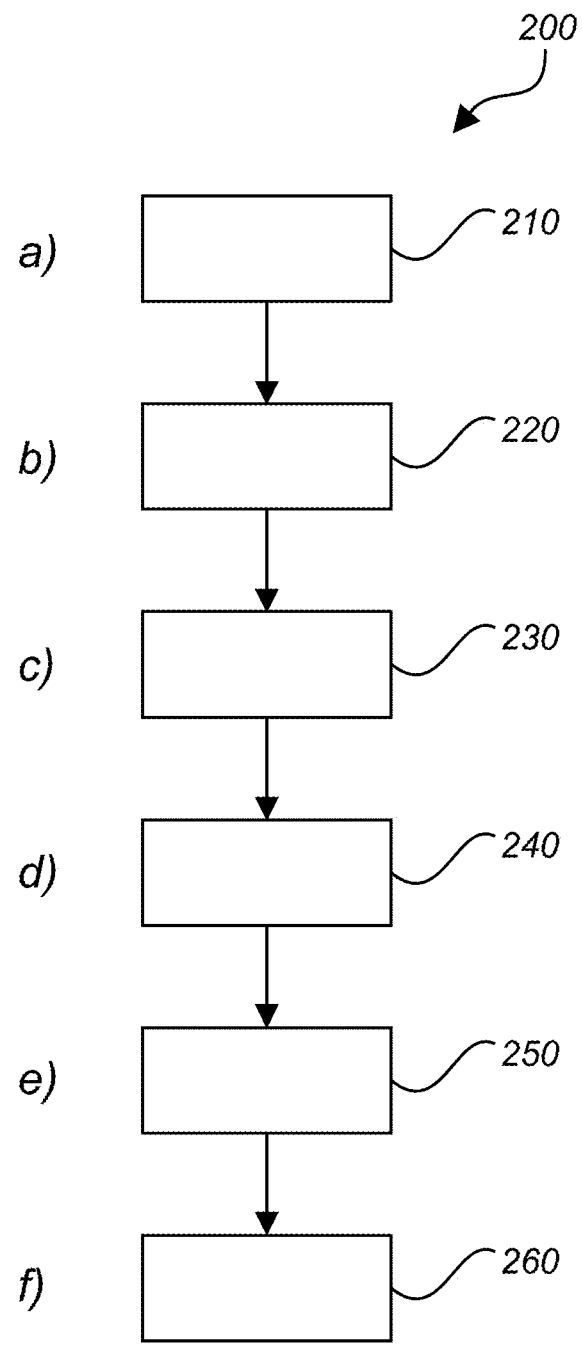
FIG. 9 shows a further example of a method.

FIG. 9 shows a further option, in which in addition to the pixel layout, at least one layout is provided on the surface of the calibration slide, which is selected from the group comprising a monolayer of colored microbeads and a resolution and distortion test target.

The method further comprises the following steps:

In a fourth step 240, also referred to as step d), image data of the at least one layout is acquired as further calibration test data.

In a fifth step 250, also referred to as step e), further predetermined standard calibration data of the at least one layout are provided.

In a sixth step 260, also referred to as step f), the acquired further calibration test data and the stored further predetermined standard calibration data are compared for calibrating a parameter of the fluorescence microscope, wherein the parameter is selected from the group comprising focus quality of the fluorescence microscope; and resolution and stitching artifacts.

Figure 10:
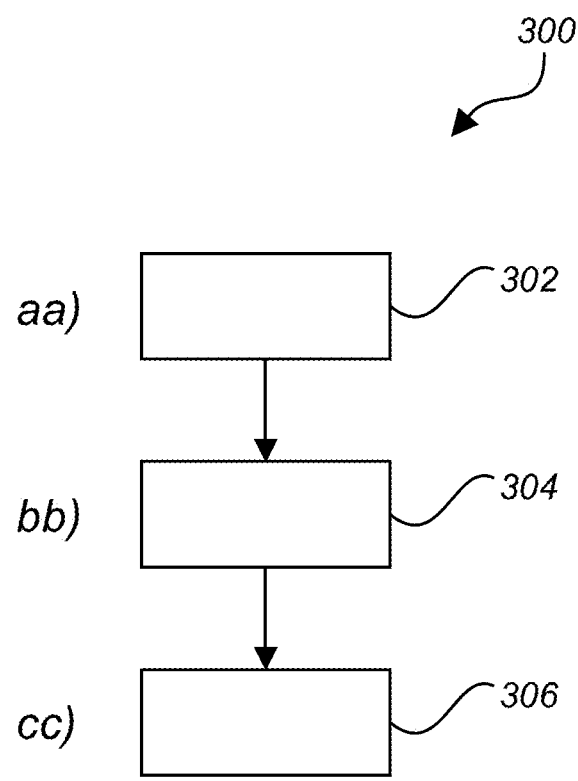
FIG. 10 shows basic steps of an example of a method for manufacturing a fluorescence calibration slide with a plurality of layouts.

FIG. 10 shows a method 300 of manufacturing a calibration slide with a plurality of layouts comprising a pixel layout with a plurality of spaced apart metal nanostructures arranged on a surface of the substrate, a monolayer of colored microbeads, and a resolution and distortion test target, the method comprises the following steps:

aa) depositing 302 a monolayer of colored microbeads on a substrate forming a microscope slide;

bb) depositing 304 a pixel layout and a resolution and distortion test target on two different substrates forming two cover slips; and cc) assembling 306 two cover slips on the microscope slide to form a calibration slide.

Preferably, both the substrate mentioned at step aa), and the coverslip with the pixel layout at step bb) have low auto-fluorescence.

The metal nanostructures may be prepared using nanoimprint lithography and dry etching. For example, substrate conformal imprint lithography (SCIL) may be used to define an etch mask (e.g. silica based sol-gel) on a continuous aluminium layer, after which this patter is transferred into the aluminium using an anisotropic reactive ion etch based on chlorine chemistry.

The resolution and distortion target may be manufactured via an optical lithography process.

For manufacturing the monolayer of colored microbeads, a specifically chemical process is normally required with printing/spotting steps of the beads on the surface and subsequently washing out the beads excess.

However, making the microbeads monolayer on the same slide after SCIL or optical lithography is impossible because SCIL destroys chemical surface modification. Making SCIL after microbeads is also impossible, since the UV step destroys the microbead bonding to the surface and the surface modification makes aluminium deposition impossible. Optical lithography after SCIL is also impossible, since SCIL etching destroys features made with optical lithography.

Although every target (pixel layout, colored microbeads, and resolution and distortion test target) is created via a very different process and these processes are not compatible with each other, these targets can still be able to be combined in a single calibration slide by manufacturing them on different substrates.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A calibration slide for a fluorescence microscope, comprising:
   a low auto-fluorescence substrate; and
   a pixel layout comprising a plurality of spaced apart metal nanostructures arranged on a surface of the substrate.

2. The calibration slide of claim 1, wherein the substrate is optically transparent.

3. The calibration slide of claim 1, wherein the metal nanostructures are arranged to couple to each other.

4. The calibration slide of claim 1, wherein the pixel layout comprises at least two pixel sub-layouts, wherein the at least two pixel sub-layouts are configured to generate different colors under bright-light illumination.

5. The calibration slide of claim 1, wherein the metal nanostructures each comprises one of gold, silver, copper or aluminium.

6. The calibration slide of claim 1, wherein each metal nanostructure has a cross-sectional dimension in a range of either 30 nm to 700 nm or 60 nm to 450 nm;
- wherein each metal nanostructure has a thickness in a range of either 10 nm to 1 μm or 25 nm to 150 nm;
- wherein a distance between adjacent metal nanostructures is comparable to a visible light wavelength, which is in a range of either 100 nm to 1 μm or 180 nm to 650 nm.

7. The calibration slide of claim 1, wherein in addition to the pixel layout, at least one layout is provided on the surface of the calibration slide, the at least one layout comprising:
- a monolayer of colored microbeads;
- a resolution and distortion test target; or
- a layer of inorganic phosphors.

8. A calibration system, comprising:
- a fluorescence microscope; and
- a calibration slide;
- wherein the fluorescence microscope comprises:
- a light source; and
- a light detector;
- wherein the light source and the light detector are arranged in an optical path;
- wherein in calibration, the light source is configured to provide light to be absorbed by metal nanostructures of the calibration slide positioned in the optical path at an excitation wavelength to produce one or a combination of photo-luminescence or fluorescence light; and
- wherein the light detector is configured to detect the produced one or combination of photo-luminescence or fluorescence light for acquiring fluorescent image data as calibration test data for calibration purposes;
- wherein the calibration slide comprises:
- a low auto-fluorescence substrate; and
- a pixel layout comprising a plurality of spaced apart metal nanostructures arranged on a surface of the substrate;
- wherein the metal nanostructures are arranged to produce plasmon resonances that allow absorbing light at an excitation wavelength to produce the one or combination of photo-luminescence or fluorescence light for generating a fluorescent image; and
- wherein the fluorescent image comprises a plurality of pixel intensity values that are provided for calibration of the fluorescence microscope.

9. The calibration system of claim 8, further comprising a calibration device comprising:
- a storage unit; and
- a processing unit;
- wherein the storage unit is configured to store predetermined standard calibration data of at least one fluorescence channel;
- wherein the processing unit is configured to compare the acquired calibration test data with the stored predetermined standard calibration data to generate an intensity correction profile of the at least one fluorescence channel; and
- wherein the intensity correction profile is provided for correcting fluorescence image data of a fluorescent pathological sample obtained with the fluorescence microscope for the at least one fluorescence channel.

10. The calibration system of claim 8, wherein in addition to the pixel layout, at least one layout is provided on the surface of the calibration slide and comprises one of a monolayer of colored microbeads or a resolution and distortion test target;
- wherein the light detector is configured to acquire image data of the at least one layout as further calibration test data;
- wherein the storage unit is configured to store further predetermined standard calibration data of the at least one layout;
- wherein the processing unit is configured to compare the acquired further calibration test data and the stored further predetermined standard calibration data for calibrating a parameter of the fluorescence microscope; and
- wherein the parameter comprises one of:
- focus quality of the fluorescence microscope; or
- resolution and stitching artifacts.

11. The calibration system of claim 8, wherein the fluorescence microscope is an epi-fluorescence microscope.

12. The calibration system of claim 8, wherein the calibration slide is permanently mounted on the fluorescence microscope.

13. A method for calibrating a fluorescence microscope comprising a light source and a light detector, which are arranged in an optical path, the method comprising the following steps:
- a) illuminating a calibration slide positioned in the optical path with light from the light source towards the light detector;
- wherein the calibration slide comprises:
- a low auto-fluorescence substrate; and
- a pixel layout comprising a plurality of spaced apart metal nanostructures arranged on a surface of the substrate; and
- wherein the light illuminating the calibration slide produces plasmon resonances that allow absorbing light at an excitation wavelength to produce one or a combination of photo-luminescence or fluorescence light for generating a fluorescent image comprising a plurality of pixel intensity values that are provided for calibration of the fluorescence microscope;
- b) acquiring fluorescent image data of the fluorescence image as calibration test data; and
- c) using the calibration test data for calibration purposes of the fluorescence microscope.

14. The method of claim 13, wherein the method step c) further comprises the following sub-steps:
- c1) providing predetermined standard calibration data;
- c2) comparing the acquired calibration test data with the predetermined standard calibration data to generate an intensity correction profile; and
- c3) using the intensity correction profile to calibrate fluorescence image data of a fluorescent pathological sample obtained with the fluorescence microscope.

15. The method of claim 13, wherein in addition to the pixel layout, at least one layout is provided on the surface of the calibration slide and comprises one of a monolayer of colored microbeads or a resolution and distortion test target; and
- wherein the method further comprises the following steps:
- d) acquiring image data of the at least one layout as further calibration test data;
- e) providing further predetermined standard calibration data of the at least one layout; and
- f) comparing the acquired further calibration test data and the stored further predetermined standard calibration data for calibrating a parameter of the fluorescence microscope;
- wherein the parameter comprises one of:
- focus quality of the fluorescence microscope; or
- resolution and stitching artifacts.

16. A method of manufacturing a fluorescence calibration slide with a plurality of layouts comprising a pixel layout with a plurality of spaced apart metal nanostructures arranged on a surface of the substrate, a monolayer of colored microbeads, and a resolution and distortion test target, the method comprises the following steps:
- aa) depositing a monolayer of colored microbeads on a substrate forming a microscope slide;
- bb) depositing a pixel layout and a resolution and distortion test target on two different substrates forming two cover slips; and
- cc) assembling the two cover slips on the microscope slide to form a calibration slide.

17. The calibration slide of claim 1, further comprising a cover slip with low auto-fluorescence for covering and protecting the pixel layout.

18. The calibration slide of claim 1, wherein the metal nanostructures each comprises aluminium or an aluminium alloy.

19. A calibration slide for a fluorescence microscope, comprising:
- a low auto-fluorescence substrate; and
- a pixel layout comprising a plurality of spaced apart metal nanostructures arranged on a surface of the substrate, the plurality of spaced apart metal nanostructures comprising one of a plurality of different color targets corresponding to color calibration and a fluorescence target corresponding to fluorescence calibration.

20. A calibration slide for a fluorescence microscope, comprising:
- a low auto-fluorescence substrate; and
- a pixel layout comprising a plurality of spaced apart metal nanostructures arranged on a surface of the substrate, the plurality of spaced apart metal nanostructures comprising a plurality of targets corresponding to calibration of the slide.

* * * * *